United States Patent
Bardouillet et al.

(10) Patent No.: US 6,859,640 B2
(45) Date of Patent: Feb. 22, 2005

(54) DEMODULATION CAPACITY OF AN ELECTROMAGNETIC TRANSPONDER

(75) Inventors: Michel Bardouillet, Rousset (FR); Nathalie Donat, Trets (FR); Vineet Tiwart, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 434 days.

(21) Appl. No.: 10/038,515

(22) Filed: Jan. 2, 2002

(65) Prior Publication Data

US 2002/0105376 A1 Aug. 8, 2002

Related U.S. Application Data

(63) Continuation of application No. 09/847,531, filed on May 2, 2001.

(30) Foreign Application Priority Data

May 5, 2000 (FR) ............................................. 00/05802

(51) Int. Cl.$^7$ .......................... G08B 23/00; H04B 5/00; H04B 1/16; H04Q 5/22
(52) U.S. Cl. ................... 455/41.1; 455/572; 455/343.5; 455/899; 340/693.4; 340/10.34
(58) Field of Search .............................. 455/41.1, 41.2, 455/572, 151.2, 337, 343.1, 343.2, 343.5, 899; 340/693.1, 693.4, 10.1, 10.3, 10.34, 10.5; 323/299, 301, 304, 310, 312, 313

(56) References Cited

U.S. PATENT DOCUMENTS

| | | | | |
|---|---|---|---|---|
| 4,786,903 A | * | 11/1988 | Grindahl et al. | ........... 340/10.4 |
| 5,345,231 A | * | 9/1994 | Koo et al. | ............. 340/870.31 |
| 5,815,355 A | | 9/1998 | Dawes | |
| 5,889,489 A | | 3/1999 | Friedman et al. | |
| 6,052,055 A | * | 4/2000 | Bouvier | ................... 340/572.1 |
| 6,288,630 B1 | * | 9/2001 | Bardouillet | ............ 340/310.01 |
| 6,356,198 B1 | * | 3/2002 | Wuidart et al. | .......... 340/572.5 |
| 6,636,146 B1 | * | 10/2003 | Wehoski | .................... 340/10.4 |

FOREIGN PATENT DOCUMENTS

FR  2 751 148 A1  1/1998
FR  2 756 953 A1  6/1998

OTHER PUBLICATIONS

French Search Report from French Patent Application No. 00/05802, filed May 5, 2000.

* cited by examiner

Primary Examiner—Duc M. Nguyen
(74) Attorney, Agent, or Firm—Lisa K. Jorgenson; James H. Morris; Wolf, Greenfield & Sacks, P.C.

(57) ABSTRACT

An electromagnetic transponder including an oscillating circuit adapted to extracting from a radiating field a high-frequency amplitude-modulated signal, circuitry for extracting from said high-frequency signal an approximately D.C. supply voltage, a demodulator of data carried by the high-frequency signal, and circuitry for separately regulating the supply voltage and a useful voltage carrying the data.

60 Claims, 2 Drawing Sheets

DEMODULATION CAPACITY OF AN ELECTROMAGNETIC TRANSPONDER

This application is a continuation of prior application Ser. No. 09/847,531, filed on May 2, 2001, entitled Improvement of the Demodulation Capacity of an Electromagnetic Transponder.

BACKGROUND OF THE INVENTION

1. Field of the Invention

The present invention relates to an electromagnetic transponder, that is, a transceiver (generally mobile) capable of being interrogated in a contactless and wireless manner by an entity (generally fixed), called a read and/or write terminal. The present invention more specifically relates to transponders having no independent power supply. Such transponders extract the power supply required by the electronic circuits included therein from the high frequency field radiated by an antenna of the read/write terminal, and the data transmitted from the fixed entity to the transponder are transmitted by this high-frequency field in amplitude modulation. The present invention applies to such transponders, be they read-only transponders, that is, transponders adapted to operating with a terminal which only reads the transponder data, or read/write transponders, which contain data that can be modified by the terminal.

2. Discussion of the Related Art

Systems using electromagnetic transponders are based on the use of oscillating circuits including a winding forming an antenna, on the transponder side and on the read/write terminal side. These circuits are intended to be coupled by a close magnetic field when the transponder enters the field of the read/write terminal.

Figure 1:
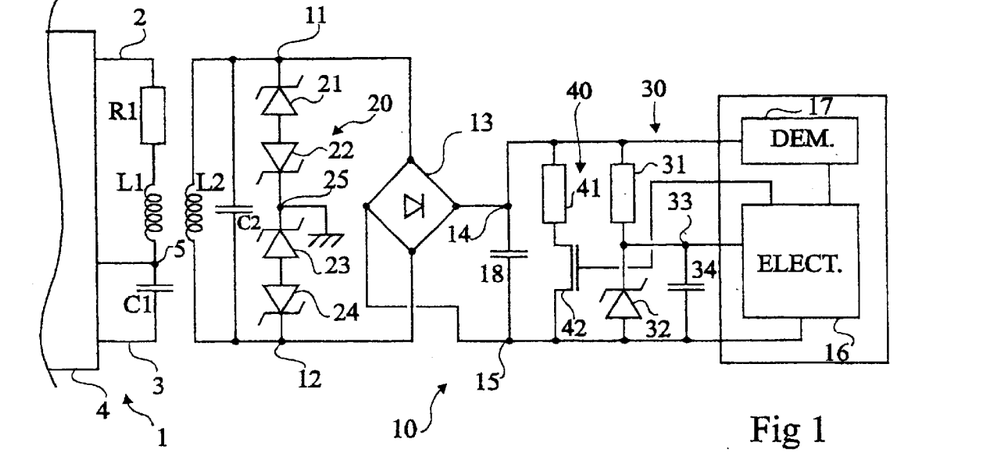
FIGS. 1 to 3, previously described, are intended to show the state of the art and the problem to solve.

FIG. 1 very schematically shows a conventional example of a data exchange system between a read/write terminal 1 and a transponder 10 of the type to which the present invention applies.

Generally, terminal 1 is essentially formed of a series oscillating circuit formed of an inductance L1 in series with a capacitor C1 and a resistor R1, between an output terminal 2 of an amplifier or antenna coupler (not shown) and a reference terminal 3 (generally the ground). The antenna coupler belongs to a circuit 4 for controlling the oscillating circuit and for exploiting the received data including, among others, a modulator-demodulator and a microprocessor for processing the control signals and the data. In the example shown in FIG. 1, node 5 of connection of capacitor C1 to inductance L1 forms a terminal for sampling a data signal received for the demodulator. Circuit 4 of the terminal generally communicates with different input/output circuits (keyboard, screen, means of exchange with a provider, etc.) and/or processing circuits, not shown. The circuits of the read/write terminal generally draw the power required by their operation from a supply circuit (not shown) connected, for example, to the electric supply system or to batteries.

A transponder 10, intended for cooperating with a terminal 1, essentially includes a parallel oscillating circuit formed of an inductance L2, in parallel with a capacitor C2 between two A.C. input terminals 11, 12 of a rectifying circuit 13 (for example, a fullwave rectifying bridge). The output voltage of bridge 13, sampled across the rectified output terminals 14, 15 thereof, is intended for providing, not only a power supply to electronic data processing circuits 16 (ELEC), but also the very data, modulated in amplitude for a demodulator 17 (DEM).

Since transponder 10 draws its power from the field radiated by terminal 1, it is necessary to provide a circuit 20 for limiting the input voltage of rectifying system 13 that would otherwise risk being damaged by voltages that are too high or carrying these excessively high voltages downstream and thus damaging the electronic circuits. Protection circuit 20 is generally placed as high upstream as possible, that is, upstream of bridge 13. It is, for example, formed of two series-opposition associations of zener diodes 21, 22, 23, 24 with identical thresholds. Being upstream of rectifying bridge 13, a first series-opposition association of zener diodes 21 and 22 is connected between terminal 11 and a ground terminal 25 (for example, confounded with ground terminal 16 at the output of bridge 13). A second series-opposition association of zener diodes 23 and 24 is connected between terminals 12 and 25.

In the example of FIG. 1, the transponder includes, upstream of bridge 13, a voltage regulation circuit 30, the function of which is to provide as regular a power supply as possible to electronic circuits 16. For example, circuit 30 is formed of a resistor 31 in series with a zener diode 32, between terminals 14 and 15. The midpoint 33 of this series connection forms an output terminal providing an approximately D.C. supply voltage to circuit 16. This supply voltage is smoothed by a capacitor 34 in parallel with zener diode 32, the anode of which is connected to terminal 15 and the cathode of which is connected to terminal 33. It should be noted that another capacitor 18 is generally directly connected between terminals 14 and 15 to smooth the voltage transmitted to demodulator 17, as will be seen hereafter.

The transmission of information from transponder 10 to terminal 1 is generally performed by modifying the load formed by this transponder on the terminal's field. A simple way to achieve this is to connect, between terminals 14 and 15, a so-called back-modulation circuit 40. This circuit is, to simplify, formed of a resistor 41 in series with a switch 42 (for example, a MOS transistor), the control terminal of which is connected to electronic circuit 16, and more precisely to the output of a modulator (not shown).

The oscillating circuit of terminal 1 is excited by a high-frequency signal, for example, at 13.56 MHz. The oscillating circuits of terminal 1 and of transponder 10 are generally tuned on the frequency of a transmission carrier corresponding to this high-frequency signal, that is, their respective resonance frequencies are set to a frequency of, for example, 13.56 MHz. This tuning aims at maximizing the power diffusion to the transponder, generally, a card of credit card format or a tag of still smaller format, integrating the different transponder components. The high-frequency remote supply carrier transmitted by terminal 1 is also used as a data transmission carrier. This carrier is generally modulated in amplitude by the terminal according to different coding techniques to transmit the data to the transponder. In response, the back modulation performed by the transponder generally is at a much lower frequency (for example, 847 kHz), which enables the terminal to detect the load variations (be it by amplitude or phase modulation).

Figure 2:
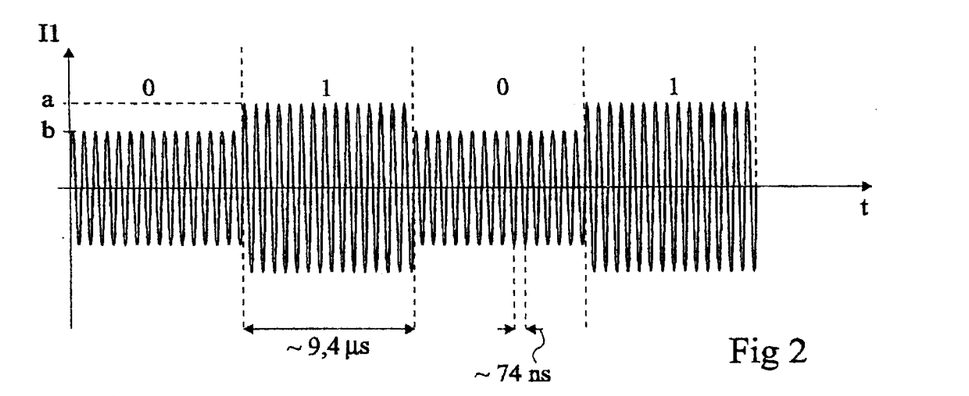

FIG. 2 illustrates a conventional example of a data transmission from terminal 1 to a transponder 10. This drawing shows an example of shape of the excitation signal of antenna L1 for the transmission of a code 0101. The modulation currently used is an amplitude modulation with a 106-kbit per second rate (1 bit is transmitted in approximately 9.4 microseconds) much smaller than the frequency of the carrier coming from the transmission oscillator (period of approximately 74 nanoseconds for a 13.56 MHz frequency). The amplitude modulation is generally performed with a modulation rate, defined as being the difference of the peak amplitudes (a, b) between two states (1 and 0) divided by the sum of these amplitudes, much smaller than one due to the need for supply of transponder 10. For example, the modulation rate is on the order of 10%. It should be noted that, whatever the type of modulation used (for example, amplitude, phase, or frequency modulation) and whatever the type of data coding (NRZ, NRZI, BPSK, Manchester, ASK, etc.), the transmission is performed by shifts between two binary levels on the remote supply carrier.

A disadvantage of conventional transponders is that the use of means (20, FIG. 1) for clipping the voltage recovered across the oscillating circuit (L2, C2, FIG. 1) adversely affects the correct data reception in a transmission by amplitude shifts that is not in all or nothing. Indeed, if the transponder is relatively close to the terminal, the voltage is likely to be clipped by circuit 20 in such a way that the transponder demodulator is then incapable of making out a state 0 from a state 1 due to the modulation rate used. Further, this loss of information can occur without having a clipping level lower than the level of state 0 (b, FIG. 2). It is indeed sufficient for the level at state 1 to be clipped to have a risk of interpretation error by the transponder demodulator.

Figure 3:
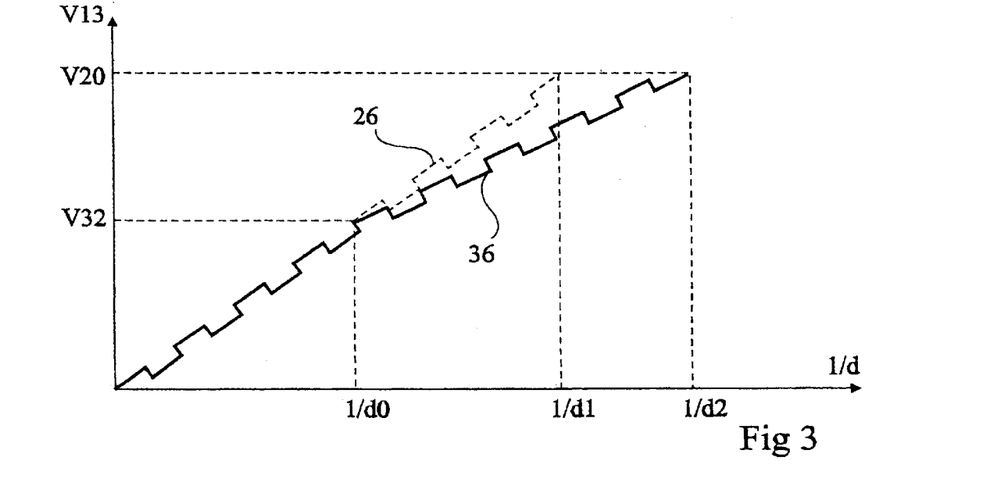

This disadvantage is illustrated by FIG. 3, which shows a simplified example of the shape of voltage V13 across output terminals 14 and 15 (FIG. 1) of rectifying bridge 13 as a function of the inverse of distance d separating the transponder from the terminal. Since the signal shapes of FIG. 3 which will be described hereafter will show an amplitude modulation of the remote supply carrier, it may also be considered that voltage V13 is expressed as a function of time as the transponder progressively comes close to the terminal.

A first curve 26 in dotted lines illustrates the transponder operation in the absence of a regulation circuit 30. In such a configuration, the voltage across capacitor C2 is clipped as soon as threshold V20 of the zener diodes of circuit 20 is reached. Accordingly, it can be considered that from a distance d1 on, the transponder is no longer capable of demodulating the data carried by signal 26 since this signal has turned into a continuous and constant level substantially corresponding to voltage V20 (neglecting the series voltage drop in rectifying bridge 13).

The system operation is improved by the presence of regulation circuit 30. This operation is illustrated by curve 36 in FIG. 3 where the power consumption of circuit 16 is neglected. A first difference with curve 26 is that the presence of resistor 31 in series with zener diode 32 (or with smoothing capacitor 34) causes a voltage drop with respect to the preceding case since the power of the radiated field cannot be modified. As a result, distance d2 at which the clipping appears on the level of voltage V20, downstream of the rectifying bridge, is much closer than distance d1. Accordingly, the operation is maintained for a wider range. However, the presence of this resistor that distributes the power between that for the supply and that for the demodulator attenuates the amplitude available for the demodulator. This attenuation is even greater once zener diode 32 is in avalanche. In FIG. 3, it has been assumed that voltage level V32, corresponding to the threshold of zener diode 32 between terminals 14 and 15 (taking account of resistance 31) is reached for a distance d0. As long as this distance has not been reached, that is, as long as the transponder is further away from this terminal than this threshold, the amplitude attenuation of the modulation performed by resistor 31 is relatively low and can be neglected. Curves 26 and 36 are confounded for distances greater than d0 (left-hand portion of FIG. 3). Between distances d0 and d2, diode 32 is in avalanche and the amplitude of the modulation of signal 36 is attenuated. From distance d2 on, the diodes of circuit 20 are in avalanche and the modulation can no longer be detected.

The use of a regulation circuit 30 such as described in FIG. 1 clearly already is an improvement as compared to the simple use of the limiting circuit upstream of the rectifying bridge. However, it is necessary to perform a compromise between the value given to resistance 31 and the so-called "blinding" area, that is, the distance range (distances smaller than d2) in which the transponder can no longer detect data. The greater the value of resistance 31, the closer the shape of the curve will be to shape 26 with no regulator. The smaller the resistance, the more the blinding area is reduced, but the smaller the amplitude of the data modulation between distances d0 and d2.

Another known solution to solve the problem of a voltage varying according to distance consists of limiting the transmission power of the terminal. A disadvantage of such a solution however is that this then limits the transponder system range. Further, the magnetic fields that the transponders are supposed to withstand are most often imposed by standards and the application of the standards currently in force results in that the magnetic field received by the transponder, when its clipping means starts operating, is much smaller than the maximum magnetic field that the transponder must be able to withstand according to standards. Accordingly, the transponder is often supplied by a signal clipped by circuit 20 and the data are then lost.

The above problems are more critical still for low power consumption transponders. Indeed, in this case, the circuits internal to the transponder provided to have a low power consumption are not able to withstand high voltages, so that the clipping means must be sized relatively low.

SUMMARY OF THE INVENTION

An object of the present invention is to overcome the disadvantages of known electromagnetic transponders as concerns the unwanted effects of the clipping means on the amplitude demodulation.

The present invention more specifically aims at providing a novel electromagnetic transponder that can withstand high magnetic fields in the vicinity of a read/write terminal without for all this adversely affecting the recovery of the data transmitted by this terminal.

The present invention also aims at providing a solution that requires no modification of the read/write terminals and that is thus compatible with existing read/write systems.

The present invention also aims at providing a solution that is compatible with the search for a minimum transponder consumption.

The present invention further aims at providing a solution that requires no modification of the conventional electronic circuits (demodulator and data processing circuit) of the transponder.

To achieve these and other objects, the present invention provides an electromagnetic transponder including an oscillating circuit adapted to extracting from a radiating field a high-frequency amplitude-modulated signal, a means for extracting from said high-frequency signal an approximately D.C. supply voltage, a demodulator of data carried by the high-frequency signal, and a means for separately regulating the supply voltage and a useful voltage carrying the data. The means for regulating the voltage of the useful signal has a time constant greater than that of the supply voltage regulation means.

According to an embodiment of the present invention, the transponder includes a means for rectifying the voltage sampled across the oscillating circuit and, in series between two rectified output terminals of this rectifying means, a first transistor and a second transistor, the midpoint of this series connection forming a terminal for sampling the signal transmitted to the demodulator.

According to an embodiment of the present invention, the control terminal of the second transistor is connected to the midpoint of a resistive dividing bridge between said terminal providing the signal to be demodulated and the ground, a capacitor being connected between said control terminal and the ground.

According to an embodiment of the present invention, the delay of taking account of the voltage variation by the second regulator is determined by the value of said capacitor.

According to an embodiment of the present invention, said first transistor is connected in parallel with a resistor and is controlled by a measurement of the voltage across the output terminals of the rectifying means.

According to an embodiment of the present invention, said transistors are MOS transistors.

The foregoing objects, features and advantages of the present invention, will be discussed in detail in the following non-limiting description of specific embodiments in connection with the accompanying drawings.

DETAILED DESCRIPTION

The same elements have been referred to with the same references in the different drawings. For clarity, only those elements necessary to the understanding of the present invention have been shown in the drawings and will be described hereafter. In particular, the different circuits of processing and exploitation of the signals received and transmitted by the transponder have not been detailed. It should only be noted that the reception circuits are intended for receiving signals in amplitude shift keying with, preferably, a modulation rate under 30%.

A feature of the present invention is to provide separate regulation of the supply voltage of the electronic circuits of the transponder and of the demodulator input voltage. Another feature of the present invention is that these voltage regulators are provided with different time constants. In other words, to regulate the demodulator drive voltage, a relatively slow regulator with respect to the modulation frequency carried by the remote supply carrier (for example, a frequency equivalent to 106 kbits per second) will be chosen. On the supply voltage side, a fast response regulator will preferably be chosen to smooth as much as possible the transponder supply voltage.

It could have been thought that the use of a voltage regulator for the signal to be demodulated in amplitude would adversely affect the amplitude variation detection, and thus the demodulation. However, due to the delay introduced in the response of this regulator, the present invention overcomes this problem.

An advantage of providing two regulators each assigned to a different function (power supply regulation and amplitude modulation recovery) is that it is now possible to size the regulator intended for the supply voltage only for this need. Accordingly, it is no longer necessary to perform a compromise on the choice of a resistance value as used to be the case in prior art (resistor 31, FIG. 1). The regulator intended for the supply voltage can thus be provided with no series resistive voltage drop.

Preferably, the value of the voltage provided by the demodulator regulator is smaller than the value of the voltage provided by the supply regulator. Thus, an adequate operation of the demodulator is guaranteed by guaranteeing a power supply always greater than the signal to be demodulated.

Figure 4:
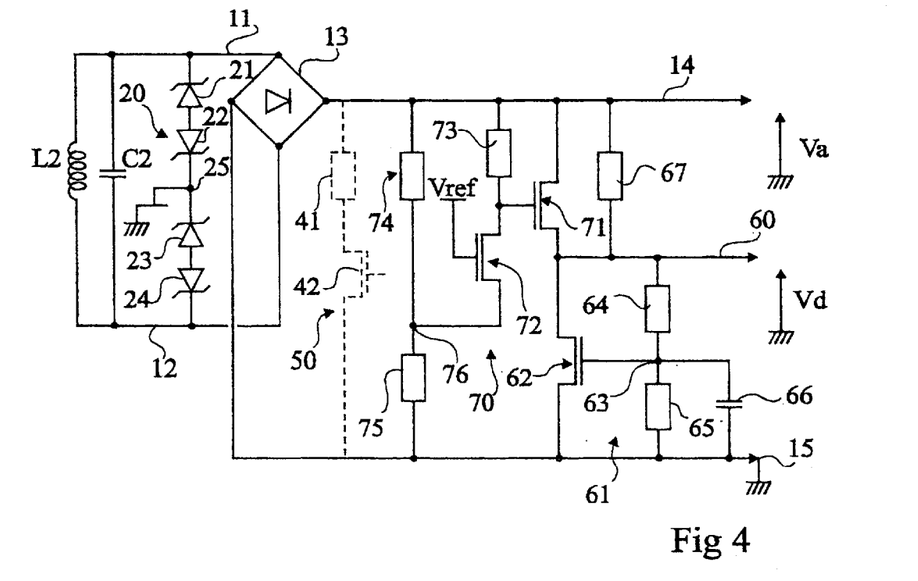
FIG. 4 schematically and partially shows an embodiment of an electromagnetic transponder according to the present invention.

FIG. 4 shows an embodiment of an electromagnetic transponder according to the present invention. The representation of FIG. 4 is to be compared to that of FIG. 1, considering that the transponder portions intended for the demodulation and for the processing of the obtained signals have not been shown (blocks 16 and 17 of FIG. 1). Similarly, back-modulation stage 50 formed of transistor 42 and of resistor 41 has been illustrated in dotted lines in FIG. 4 to insist on its incidental character in the sense of the present invention.

As previously, an electromagnetic transponder is based on the use of a parallel oscillating circuit formed of an inductance L2 in parallel with a capacitor C2 across two A.C. input terminals 11, 12 of a rectifying entity 13 (for example, a diode bridge). As previously still, the input of the diode bridge is associated with a protection circuit 20 formed, for example, of two series-opposition associations of zener diodes 21, 22 and 23, 24 between each of terminals 11 and 12 and a ground terminal 25.

The present invention intervenes downstream of rectifying bridge 13 to separately regulate a supply voltage Va, provided between rectified output terminals 14 and 15 of bridge 13 and intended for the transponder electronic processing circuits, and a voltage Vd provided between a terminal 60 and terminal 15 and carrying the useful data signal to the demodulator (17, FIG. 1) of the transponder.

Regulator 61 intended for the useful signals is essentially formed of a transistor 62 (for example, a MOS transistor) connected between terminals 60 and 15, the gate of this transistor being connected to midpoint 63 of a voltage dividing bridge formed, for example, of two resistors 64 and 65 in series between terminals 60 and 15. An element delaying the regulation of voltage Vd is formed of a capacitor 66 connected in parallel with resistor 65, that is, between the gate of transistor 62 and the ground. Terminal 60 is further connected to terminal 14 by a resistive component 67.

In the absence of other components in the circuit, transistor 62 acts as a regulator of the level of voltage Vd. Indeed, any increase of the voltage across rectified output terminals 14 and 15 of bridge 13 translates as an increase of voltage Vd which causes a proportional increase of the gate voltage of transistor 62. This results in increasing the conduction of transistor 62, and thus in modifying the voltage ratio determined by the dividing bridge formed of resistor 67 and of the equivalent resistor of components 62, 64, and 63. However, the effect of transistor 62 is delayed by means of capacitor 66, which slightly delays the voltage level increase of gate 63. Now assuming an instantaneous decrease of voltage V13 across terminals 14 and 15 of rectifying bridge 13, corresponding to a switching from state 1 to state 0 (FIG. 2) of the remote supply signal, transistor 62 will become less conductive to compensate this decrease but voltage Vd will decrease during a time determined by the value of capacitor 66 before this decrease is compensated for by a decrease of the conduction of transistor 62.

It can thus be seen that the regulation effect operates for increases as well as for decreases but that the edges of the modulation signal are transmitted on voltage Vd and are thus interpretable by the demodulator. Indeed, it being an amplitude demodulation between two voltage levels, a basic amplitude demodulator will be able to interpret the level variations. Any rising edge corresponds to a switching to a state 1 while any falling edge corresponds to a switching to a state 0.

A regulator 70, intended for generating supply voltage Va, is based, in the example of FIG. 4, on the use of a first transistor 71 (for example, a MOS transistor) connected between terminals 14 and 60. The gate of this transistor is connected to the junction point of a second transistor 72 (for example, a MOS transistor) with a resistor 73, transistor 72 being made more or less conductive according to the amplitude of the difference between voltage V13 and a reference voltage Vref. For example, a resistive dividing bridge formed of two resistors 74 and 75 in series between terminals 14 and 15 is provided. The midpoint 76 of this bridge is connected to one of the power terminals of transistor 72, the gate of which receives reference voltage Vref. Reference voltage Vref is, for example, provided by the transponder electronic processing circuits or, more simply, by a zener diode (not shown) connected in series with a resistor between terminals 14 and 15, voltage Vref being sampled from the midpoint of this series connection. Voltage Vref is of course chosen according to the minimum operating voltage of the circuit. Resistive dividing bridge 74–75 provides a voltage proportional to voltage V13. Accordingly, the gate voltage of transistor 71 will increase or decrease according to whether voltage V13 respectively increases or decreases. This increase or decrease is, in the embodiment of FIG. 4, based with respect to reference value Vref. Transistor 71 will be all the more conductive as its gate voltage increases, and thus as voltage V13 increases. Accordingly, any increase of voltage V13 translates as an increase of the conduction of transistor 71 to compensate for this effect on supply voltage Va.

The use of a reference voltage rather than a resistive dividing bridge directly driving the gate of transistor 71 enables increasing the loop gain of the regulator. However, in a simplified embodiment, it may of course be provided to directly drive the gate of transistor 71 with the midpoint of a resistive dividing bridge between terminals 14 and 15. This respects the principle of the present invention, which is to have two voltage regulation components in series between terminals 14 and 15, the junction point of these regulation components providing voltage Vd with a different time constant for the lower regulator. This enables this regulator to be transparent in dynamic operation.

Figure 5:
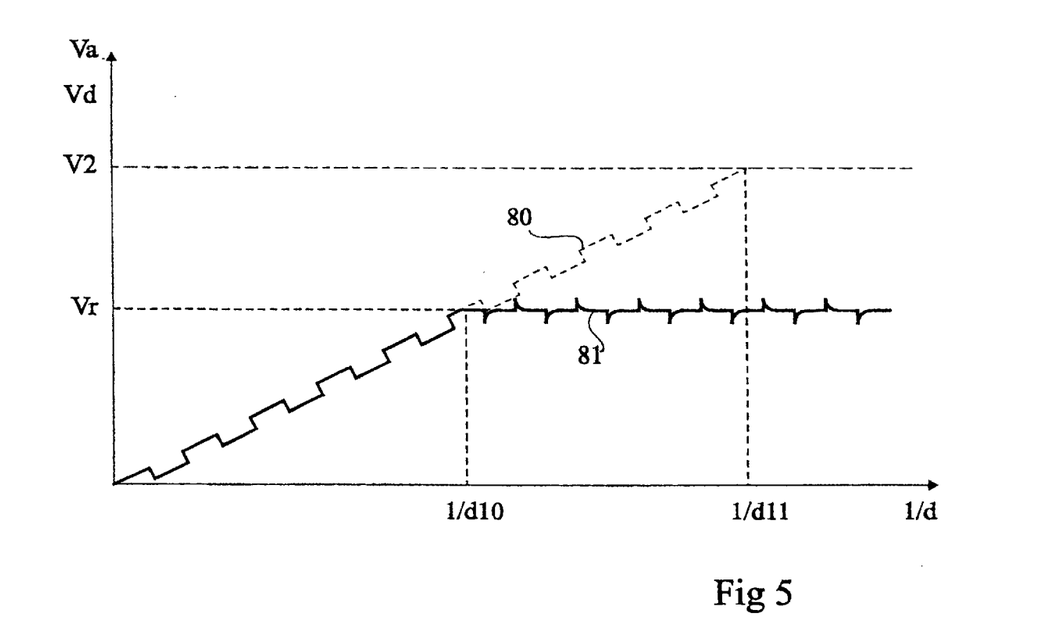
FIG. 5 illustrates the operation of a transponder according to the present invention.

The operation of the transponder of FIG. 4 is illustrated by FIG. 5 which shows an example of the shape of voltages Va and Vd as a function of the inverse of distance. The representation of FIG. 5 is to be compared with that of FIG. 3. The shape of supply voltage Va is illustrated by dotted line 80 while the shape of voltage Vd of the useful signal is illustrated by plot 81 in full line. As long as voltage Vd has not reached a threshold determined by the respective sizings of resistors 64, 65, 67 and of transistor 62, said transistor is off. Transistor 71 is saturated, so that it short-circuits resistor 67, voltage V13 being too low to generate a variation of the conduction of transistors 71 and 72. Accordingly, in this situation where the distance is greater than distance d10 (that is, in the left-hand portion of FIG. 5), voltages Va and Vd are approximately similar, neglecting the series voltage drops in transistor 71. When voltage Vd becomes sufficient to operate regulator 61, it is then regulated to a mean predetermined level Vr, letting through the edges corresponding to the state switchings of the modulation signal. Voltage Va (plot in dotted lines 80) continues increasing with the distance increase until reaching a distance d11 where the voltage of point 76 becomes sufficient to turn transistor 72 on. The level of voltage Va is then regulated on a predetermined value V2.

It should be noted that resistor 67 enables transmitting the data to terminal 60 outside of the operating range of the supply voltage regulator, that is, when transistor 71 is completely off, voltage V13 being clipped by circuit 20.

It should also be noted that values V1 and V2 of voltage Vr and Va depend on the respective sizings of the circuit resistors and on the transistors used.

It should further be noted that voltage levels Vr and V2 are lower than the activation threshold of clipping means 20. Due to the regulation performed by the present invention, this threshold can now be chosen only to respect the circuit security constraints.

Although this has not been shown in FIG. 4, a smoothing capacitor (18, FIG. 1) will generally be provided across terminals 14 and 15 to smooth the rectified voltage.

An advantage of the present invention is that it makes the demodulation voltage independent from the supply voltage.

Another advantage of the present invention is that it increases the transponder operating range.

Another advantage of the present invention is that it provides the complete security of the transponder by providing the use of a clipping circuit 20 upstream of the rectifying bridge. Further, this protection applies for brief overvoltages as well as for lasting overvoltages, conversely to what would be provided by a solution consisting of only regulating the supply voltage.

Another advantage of the present invention is that it improves the security of transponders against some fraud attempts. Indeed, one of the conventional fraud possibilities is to measure the consumption variation of the transponder supply from the external terminals of its integrated circuit. The present invention eliminates this possibility by implementing a regulation system that makes these variations invisible across the antenna, and thus across the external terminals of the integrated circuit.

Of course, the present invention is likely to have various alterations, modifications, and improvements which will readily occur to those skilled in the art. In particular, other components than those indicated in the embodiment taken as an example may be used. On this regard, it should be noted that, for example, bipolar transistors may be used instead of the MOS transistors and the resistive elements may be formed of components different from simple resistors (they may for example be formed of transistors). Further, the sizing of a transponder implementing the present invention is within the abilities of those skilled in the art based on the functional indications given hereabove and on the operating characteristics desired for the voltage levels.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electromagnetic transponder including:
   an oscillating circuit adapted to extracting from a radiating field a high-frequency amplitude-modulated signal;
   a means for extracting from said high-frequency signal an approximately D.C. supply voltage; and
   a demodulator of data carried by the high-frequency signal; and
   a means for separately regulating the supply voltage and a useful voltage carrying the data said means for regulating the voltage of the useful signal having a time constant greater than that of the supply voltage regulation means.

2. The transponder of claim 1, including a means for rectifying the voltage sampled across the oscillating circuit and, in series between two rectified output terminals of this rectifying means, a first transistor and a second transistor, the midpoint of this series connection forming a terminal for sampling the signal transmitted to the demodulator.

3. The transponder of claim 2, wherein the control terminal of the second transistor is connected to the midpoint of a resistive dividing bridge between said terminal providing the signal to be demodulated and the ground, a capacitor being connected between said control terminal and the ground.

4. The transponder of claim 3, wherein the delay of taking account of the voltage variation by the second regulator is determined by the value of said capacitor.

5. The transponder of claim 2, wherein said first transistor is connected in parallel with a resistor and is controlled by a measurement of the voltage across the output terminals of the rectifying means.

6. The transponder of claim 2, wherein said transistors are MOS transistors.

7. An electromagnetic transponder comprising:
   an oscillating circuit to receive an amplitude-modulated radiated signal and to supply an amplitude-modulated electrical signal in response thereto;
   means, responsive to the amplitude-modulated signal, for supplying a supply voltage in accordance with a first time constant and for supplying a regulated data signal in accordance with a second time constant greater than the first time constant; and
   a demodulator circuit to receive the regulated data signal and to supply a demodulated signal.

8. The electromagnetic transponder of claim 7 wherein the demodulator circuit comprises an amplitude demodulator circuit.

9. The electromagnetic transponder of claim 7 wherein the means for supplying the supply voltage and the regulated data signal comprises means for receiving the supply voltage and generating the regulated data signal in response thereto.

10. The electromagnetic transponder of claim 7 wherein the means for supplying the supply voltage and the regulated data signal comprises means for supplying the regulated data signal at a voltage equal to the supply voltage if the amplitude-modulated electrical signal is below a threshold.

11. The electromagnetic transponder of claim 7 wherein the regulated data signal has an ac component and a dc component, and the means for supplying the supply voltage and the regulated data signal includes means for limiting the dc component of the regulated data signal.

12. The electromagnetic transponder of claim 7 wherein the means for supplying a supply voltage and a regulated data signal comprises a rectifier circuit having input terminals and output terminals.

13. The electromagnetic transponder of claim 12 wherein the means for supplying the supply voltage and the regulated data signal further comprises a clipping circuit coupled across the input terminals of the rectifier circuit.

14. The electromagnetic transponder of claim 12, wherein the means for supplying the supply voltage and the regulated data signal further comprises a first transistor and a second transistor that are connected in series between the output terminals of the rectifier circuit, a node of the series connection between the first transistor and the second transistor supplying the regulated data signal.

15. The electromagnetic transponder of claim 14, wherein the means for supplying the supply voltage and the regulated data signal further comprises a resistive divider having an output terminal and the second transistor has a control terminal connected to the output terminal of the resistive divider.

16. The electromagnetic transponder of claim 15, wherein the means for supplying the supply voltage and the regulated data signal further comprises a capacitance connected between the control terminal of the second transistor and one of the output terminals of the rectifier circuit.

17. The electromagnetic transponder of claim 16, wherein the capacitance has a capacitance value and the time constant of the regulated data signal depends on the capacitance value.

18. The electromagnetic transponder of claim 14, wherein said first transistor is connected in parallel with a resistor and is controlled in response to a voltage generated in response to the supply voltage.

19. The electromagnetic transponder of claim 17, wherein said first transistor is connected in parallel with a resistor and is controlled in response to a voltage generated in response to the supply voltage.

20. The transponder of claim 14, wherein the first transistor and the second transistor are MOS transistors.

21. The electromagnetic transponder of claim 7 wherein the amplitude-modulated radiated signal comprises a high-frequency amplitude-modulated radiated signal and the amplitude-modulated electrical signal comprises a high-frequency amplitude-modulated electrical signal.

22. The electromagnetic transponder of claim 21 wherein the means for supplying the supply voltage and the regulated data signal includes means for supplying the regulated data signal at a voltage equal to the supply voltage if the amplitude-modulated electrical signal is below a threshold, and wherein the regulated data signal has an ac component and a dc component and the means for supplying the supply voltage and the regulated data signal includes means for limiting the dc component of the regulated data signal.

23. The electromagnetic transponder of claim 21 wherein the means for supplying the supply voltage and the regulated data signal comprises a rectifier circuit having input terminals and output terminals.

24. The electromagnetic transponder of claim 23 wherein the means for supplying the supply voltage and the regulated data signal further comprises a clipping circuit coupled across the input terminals of the rectifier circuit.

25. The electromagnetic transponder of claim 23 wherein the output terminals of the rectifier circuit supply the supply voltage.

26. The electromagnetic transponder of claim 21, wherein the means for supplying the supply voltage and the regulated data signal further comprises:

a first transistor and a second transistor that are connected in series between the output terminals of the rectifier circuit, a node of the series connection between the first transistor and the second transistor supplying the regulated data signal;

a resistive divider having an output terminal, the second transistor having a control terminal connected to the output terminal of the resistive divider; and a capacitance connected between the control terminal of the second transistor and one of the output terminals of the rectifier circuit.

27. The electromagnetic transponder of claim 24, wherein the means for supplying the supply voltage and the regulated data signal further comprises:

a first transistor and a second transistor that are connected in series between the output terminals of the rectifier circuit, a node of the series connection between the first transistor and the second transistor supplying the regulated data signal;

a resistive divider having an output terminal, the second transistor having a control terminal connected to the output terminal of the resistive divider; and a capacitance connected between the control terminal of the second transistor and one of the output terminals of the rectifier circuit.

28. An electromagnetic transponder including:

an oscillating circuit to receive an amplitude-modulated radiated signal and to supply an amplitude-modulated electrical signal in response thereto;

a second circuit to receive the amplitude-modulated electrical signal and to supply a supply voltage in accordance with a first time constant and a regulated data signal in accordance with a second time constant greater than the first time constant; and a demodulator circuit to receive the regulated data signal and supply a demodulated signal.

29. The electromagnetic transponder of claim 28 wherein the demodulator circuit comprises an amplitude demodulator circuit.

30. The electromagnetic transponder of claim 28 wherein the second circuit comprises a regulator circuit to receive the supply signal and supply the regulated data signal.

31. The electromagnetic transponder of claim 28 wherein the second circuit supplies the regulated data signal at a voltage equal to the supply voltage if the amplitude-modulated electrical signal is below a threshold.

32. The electromagnetic transponder of claim 28 wherein the regulated data signal has an ac component and a dc component, and the second circuit includes a circuit to limit the dc component of the regulated data signal.

33. The electromagnetic transponder of claim 28 wherein the second circuit further comprises a rectifier circuit having input terminals and output terminals.

34. The electromagnetic transponder of claim 32 wherein the second circuit further comprises a clipping circuit coupled across the input terminals of the rectifier circuit.

35. The electromagnetic transponder of claim 32, wherein the second circuit further comprises a first transistor and a second transistor that are connected in series between the output terminals of the rectifier circuit, a node of the series connection between the first transistor and the second transistor supplying the regulated data signal.

36. The electromagnetic transponder of claim 35, wherein the second circuit further comprises a resistive divider having an output terminal and the second transistor has a control terminal connected to the output terminal of the resistive divider.

37. The electromagnetic transponder of claim 36, wherein the second circuit further comprises a capacitance connected between the control terminal of the second transistor and one of the output terminals of the rectifier circuit.

38. The electromagnetic transponder of claim 37, wherein the capacitance has a capacitance value and the time constant of the regulated data signal depends on the capacitance value.

39. The electromagnetic transponder of claim 35, wherein said first transistor is connected in parallel with a resistor and is controlled in response to a voltage generated in response to the supply voltage.

40. The electromagnetic transponder of claim 38, wherein said first transistor is connected in parallel with a resistor and is controlled in response to a voltage generated in response to the supply voltage.

41. The transponder of claim 35, wherein the first transistor and the second transistor are MOS transistors.

42. The electromagnetic transponder of claim 28 wherein the amplitude-modulated radiated signal comprises a high-frequency amplitude-modulated radiated signal and the amplitude-modulated electrical signal comprises a high-frequency amplitude-modulated electrical signal.

43. The electromagnetic transponder of claim 42 wherein the second circuit includes a circuit to supply the regulated data signal at a voltage equal to the supply voltage if the amplitude-modulated electrical signal is below a threshold and to limit the dc component of the regulated data signal.

44. The electromagnetic transponder of claim 42 wherein the second circuit further comprises a rectifier circuit having input terminals and output terminals.

45. The electromagnetic transponder of claim 44 wherein the second circuit further comprises a clipping circuit coupled across the input terminals of the rectifier circuit.

46. The electromagnetic transponder of claim 44 wherein the output terminals of the rectifier circuit supply the supply voltage.

47. The electromagnetic transponder of claim 42, wherein the second circuit further comprises:

a first transistor and a second transistor that are connected in series between the output terminals of the rectifier circuit, a node of the series connection between the first transistor and the second transistor supplying the regulated data signal;

a resistive divider having an output terminal, the second transistor having a control terminal connected to the output terminal of the resistive divider; and a capacitance connected between the control terminal of the second transistor and one of the output terminals of the rectifier circuit.

48. The electromagnetic transponder of claim 45, wherein the second circuit further comprises:

a first transistor and a second transistor that are connected in series between the output terminals of the rectifier circuit, a node of the series connection between the first transistor and the second transistor supplying the regulated data signal;

a resistive divider having an output terminal, the second transistor having a control terminal connected to the output terminal of the resistive divider; and a capacitance connected between the control terminal of the second transistor and one of the output terminals of the rectifier circuit.

49. A method for use in an electromagnetic transponder, the method comprising:

generating an amplitude-modulated electrical signal in response an amplitude-modulated radiated signal;

in response to the amplitude-modulated signal, supplying a supply voltage in accordance with a first time constant and supplying a regulated data signal in accordance with a second time constant greater than the first time constant; and demodulating the regulated data signal to produce a demodulated signal.

50. The method of claim 49 wherein demodulating comprises amplitude demodulation.

51. The method of claim 49 wherein supplying the regulated data signal comprises receiving the supply voltage and generating the regulated data signal in response thereto.

52. The method of claim 49 wherein supplying the regulated data signal comprises supplying the regulated data signal at a voltage equal to the supply voltage if the amplitude-modulated electrical signal is below a threshold.

53. The method of claim 49 wherein the regulated data signal has an ac component and a dc component, and supplying the regulated data signal comprises limiting the dc component of the regulated data signal independent of the supply voltage.

54. The method of claim 49 wherein supplying the supply voltage comprises rectifying the amplitude-modulated electrical signal.

55. The method of claim 54 wherein supplying the supply voltage comprises limiting the voltage of the amplitude-modulated electrical signal.

56. The method of claim 49 wherein generating an amplitude-modulated electrical signal comprises generating a high-frequency amplitude-modulated electrical signal in response to a high-frequency amplitude-modulated radiated signal.

57. The method of claim 56 wherein supplying the regulated data signal comprises supplying the regulated data signal at a voltage equal to the supply voltage if the amplitude-modulated electrical signal is below a threshold.

58. The method of claim 57 wherein the regulated data signal has an ac component and a dc component, and supplying the regulated data signal comprises limiting the dc component of the regulated data signal independent of the supply voltage.

59. The method of claim 58 wherein supplying the supply voltage comprises rectifying the amplitude-modulated electrical signal.

60. The method of claim 58 wherein supplying the supply voltage comprises limiting the voltage of the amplitude-modulated electrical signal.

* * * * *

UNITED STATES PATENT AND TRADEMARK OFFICE
CERTIFICATE OF CORRECTION

PATENT NO. : 6,859,640 B2
DATED : February 22, 2005
INVENTOR(S) : Michel Bardouillet, Nathalie Donal and Vineet Tiwari It is certified that error appears in the above-identified patent and that said Letters Patent is hereby corrected as shown below:

Column 8,
Line 13, should read -- decrease until reaching a distance d11 where the voltage of --

Signed and Sealed this

Third Day of May, 2005

JON W. DUDAS
*Director of the United States Patent and Trademark Office*